(12) United States Patent
Jasinski

(10) Patent No.: US 8,502,163 B2
(45) Date of Patent: Aug. 6, 2013

(54) CHARGED PARTICLE BEAM DEVICE, VACUUM VALVE THEREFOR AND OPERATION THEREOF

(75) Inventor: Thomas Jasinski, Munich (DE)

(73) Assignee: ICT Integrated Circuit Testing Gesellschaft für Halbleiterprüftechnik mbH, Heimstetten (DE)

( * ) Notice: Subject to any disclaimer, the term of this patent is extended or adjusted under 35 U.S.C. 154(b) by 71 days.

(21) Appl. No.: 13/296,885

(22) Filed: Nov. 15, 2011

(65) Prior Publication Data

US 2013/0118586 A1    May 16, 2013

(30) Foreign Application Priority Data

Nov. 10, 2011   (EP) .................................... 11188673

(51) Int. Cl.
  *H01J 37/301*   (2006.01)
  *H01J 49/24*    (2006.01)
  *F16K 51/02*    (2006.01)
  *F16K 3/00*     (2006.01)

(52) U.S. Cl.
  USPC ............... 250/430; 250/441.11; 250/491.1; 251/193; 251/301; 251/63; 251/61.2

(58) Field of Classification Search
  USPC ............. 250/430, 441.11, 491.1; 251/193, 251/301, 63, 61.2
  See application file for complete search history.

(56) References Cited

U.S. PATENT DOCUMENTS

| 2,819,034 | A | 6/1955 | Holderer |
| 4,145,026 | A | 3/1979 | Chronister |
| 7,741,601 | B2 * | 6/2010 | Noji et al. ................. 250/310 |
| 2005/0253099 | A1 * | 11/2005 | Osawa et al. ................ 251/63 |
| 2006/0124864 | A1 * | 6/2006 | Sogard ................... 250/491.1 |

FOREIGN PATENT DOCUMENTS

| DE | 19954644 A1 | 6/2001 |
| EP | 1122761 | 8/2001 |
| WO | WO-9961822 A1 | 12/1999 |
| WO | WO-2004010035 A1 | 1/2004 |
| WO | WO-2008038940 A1 | 4/2008 |
| WO | WO-2011091451 A1 | 8/2011 |

OTHER PUBLICATIONS

Extended European Search Report dated Mar. 23, 2012 for European Patent Application No. 11188673.5.

* cited by examiner

*Primary Examiner* — Nikita Wells
(74) *Attorney, Agent, or Firm* — Patterson & Sheridan, LLP

(57) ABSTRACT

A valve unit configured for a charged particle beam device having a beam path 2 is described. The valve unit includes a vacuum sealed valve housing 102 configured for a pressure difference between the inside of the valve housing and the outside of the valve housing, wherein the housing provides a beam path portion 103 for having a charged particle beam pass therethrough along the beam path, a valve positioning unit adapted for selectively providing a first movement of the valve housing such that the beam path portion is selectively moved into and out of the beam path, and at least one sealing element 122 configured for a second movement, wherein the second movement is different from the first movement.

20 Claims, 6 Drawing Sheets

CHARGED PARTICLE BEAM DEVICE, VACUUM VALVE THEREFOR AND OPERATION THEREOF

TECHNICAL FIELD OF THE INVENTION

Embodiments of the present invention relate to valves for separating vacuum environments for charged particle beam devices. Embodiments of the present invention particularly relate to charged particle beam devices and vacuum valves included therein, specifically to a valve unit configured for a charged particle beam device having a beam path, a charged particle beam device having a beam path, a multi-charged particle beam device having two or more beam paths, and a method of operating a valve unit in a charged particle beam device.

BACKGROUND OF THE INVENTION

Charged particle beam apparatuses have many functions, in a plurality of industrial fields, including, but not limited to, inspection of semiconductor devices during manufacturing, exposure systems for lithography, detecting devices and testing systems. Thus, there is a high demand for structuring and inspecting specimens within the micrometer and nanometer scale.

Micrometer and nanometer scale process control, inspection or structuring is often done with charged particle beams, e.g. electron beams, which are generated and focused in charged particle beam devices, such as electron microscopes or electron beam pattern generators. Charged particle beams offer superior spatial resolution compared to, e.g. photon beams due to their short wavelengths.

Typically, a charged particle beam device includes several chambers, such as a gun chamber, a specimen chamber or further intermediate chambers. These chambers are separated from each other and can typically be provided to individual levels of vacuum. Typically, the pressure in the gun chamber is lower as compared to the pressure in a specimen chamber. Thereby, vacuum valves are used to isolate vacuum recipients from air and from adjacent vacuum recipients or chambers. It is one desire to improve the vacuum conditions within the charged particle columns of the state of the art devices.

Further, particle generation within a charged particle beam column needs to be considered. If undesired particles are generated in a charged particle beam column or a vacuum recipient thereof, the particles can be detrimental to the vacuum conditions or can, particularly if released over a specimen to be inspected, deteriorate the measurement application by providing undesired particles on the specimen. Thereby, it has to be considered that valves for particle beam systems can have a plurality of tasks and/or requirement. Typically, the valve usually blocks a beam line and separates two vacuum recipients from each other. Further, space requirements have to be considered in light of the fact that the length of the beam path influences the optical properties of the charged particle beam column.

Yet, particle generation in vacuum chambers is also to be considered for other applications, for example processing of substrates in vacuum chambers. Thereby, typically, substrates are provided in a vacuum processing chamber for layer deposition, etching, layer structuring, masking or the like. For these applications, particles on a substrate can also deteriorate the processing process. Accordingly, it is desired for such applications to provide a valve unit with reduced particle generation.

In view of the above, it is an object of the present invention to provide an improved vacuum valve and an improved charged particle beam device that would overcome at least some of the above problems.

SUMMARY OF THE INVENTION

In light of the above, a valve unit configured for a charged particle beam device having a beam path according to independent claim 1, a charged particle beam device according to claim 10, a multi-charged particle beam device according to claim 11 and a method of operating a valve unit in a charged particle beam device according to independent claim 12 are provided. Further aspects, advantages, and features of the present invention are apparent from the dependent claims, the description, and the accompanying drawings.

According to one embodiment, a valve unit configured for a charged particle beam device having a beam path is provided. The valve unit includes a vacuum sealed valve housing configured for a pressure difference between the inside of the valve housing and the outside of the valve housing, wherein the housing provides a beam path portion for having a charged particle beam pass therethrough along the beam path, a valve positioning unit adapted for selectively providing a first movement of the valve housing such that the beam path portion is selectively moved into and out of the beam path, and at least one sealing element configured for a second movement, wherein the second movement is different from the first movement.

According to another embodiment, a valve unit configured for selectively opening and closing a passageway of a vacuum chamber is provided, wherein the passageway is defining a path. The valve unit includes a vacuum sealed valve housing configured for a pressure difference between the inside of the valve housing and the outside of the valve housing, wherein the housing provides a passageway portion for allowing travel through the passageway portion along the path, a valve positioning unit adapted for selectively providing a first movement of the valve housing such that the passageway portion is selectively moved into and out of the path, and at least one sealing element configured for a second movement, wherein the second movement is different from the first movement.

According to yet another embodiment, a charged particle beam device having a beam path is provided. The charged particle beam device includes one or more vacuum chambers, and a valve unit. The valve unit includes a vacuum sealed valve housing configured for a pressure difference between the inside of the valve housing and the outside of the valve housing, wherein the housing provides a beam path portion for having a charged particle beam pass therethrough along the beam path, a valve positioning unit adapted for selectively providing a first movement of the valve housing such that the beam path portion is selectively moved into and out of the beam path, and at least one sealing element configured for a second movement, wherein the second movement is different from the first movement. Thereby, the sealing surface is a portion of the one or more vacuum chambers.

According to another embodiment, a multi-charged particle beam device having two or more beam paths is provided. The multi-charged particle beam device includes one or more vacuum chambers, and a valve unit. The valve unit includes a vacuum sealed valve housing configured for a pressure difference between the inside of the valve housing and the outside of the valve housing, wherein the housing provides a beam path portion for having a charged particle beam pass therethrough along the beam path, a valve positioning unit adapted for selectively providing a first movement of the valve housing such that the beam path portion is selectively moved into and out of the beam path, and at least one sealing element configured for a second movement, wherein the second movement is different from the first movement. Thereby, the sealing surface is a portion of the one or more vacuum chambers.

According to a further embodiment, a method of operating a valve unit, for example, in a charged particle beam device is provided. The method includes closing the valve by moving a vacuum sealed housing along a first direction from a first position wherein housing provides a path, for example a beam path for the charged particle beam, into a second position wherein a sealing element opposes a sealing surface, and moving the sealing element in a second direction different from the first direction to press the sealing element against the sealing surface.

BRIEF DESCRIPTION OF THE DRAWINGS

So that the manner in which the above recited features of the present invention can be understood in detail, a more particular description of the invention, briefly summarized above, may be had by reference to embodiments. The accompanying drawings relate to embodiments of the invention and are described in the following.

DETAILED DESCRIPTION OF EMBODIMENTS

Figure 1A:
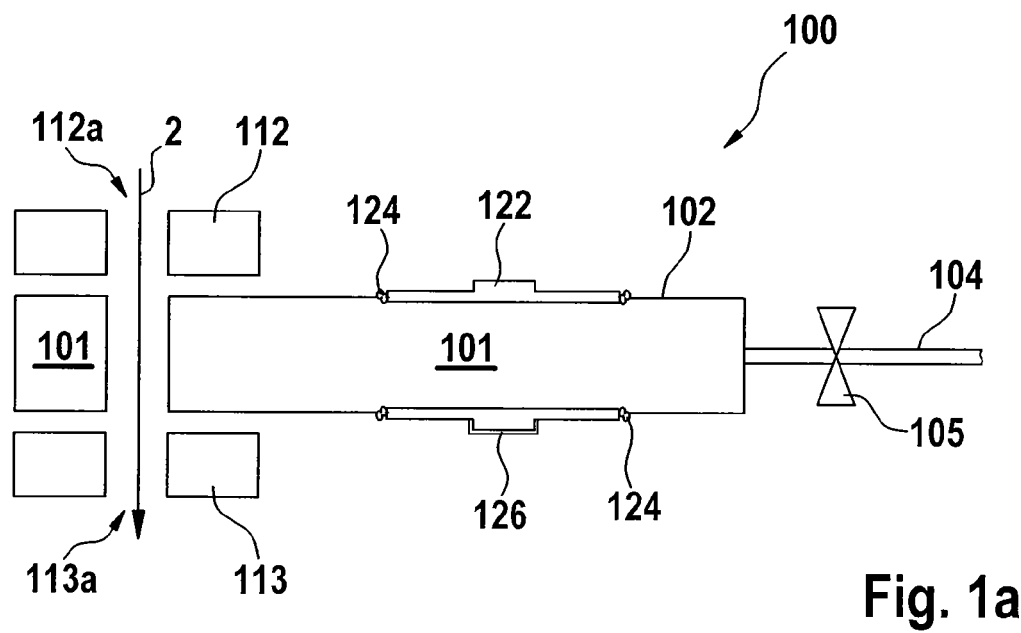
FIGS. 1A to 1C show a first view of a valve unit configured for a charged particle beam device according to embodiments described herein.

Reference will now be made in detail to the various embodiments of the invention, one or more examples of which are illustrated in the figures. Within the following description of the drawings, the same reference numbers refer to same components. Generally, only the differences with respect to individual embodiments are described. Each example is provided by way of explanation of the invention and is not meant as a limitation of the invention. Further, features illustrated or described as part of one embodiment can be used on or in conjunction with other embodiments to yield yet a further embodiment. It is intended that the description includes such modifications and variations.

Without limiting the scope of protection of the present application, in the following the charged particle beam device or components thereof will exemplarily be referred to as a charged particle beam device including the detection of secondary electrons. The present invention can still be applied for apparatuses and components detecting corpuscles such as secondary and/or backscattered charged particles in the form of electrons or ions, photons, X-rays or other signals in order to obtain a specimen image. Generally, when referring to corpuscles they are to be understood as a light signals in which the corpuscles are photons as well as particles, in which the corpuscles are ions, atoms, electrons or other particles.

A "specimen" as referred to herein, includes, but is not limited to, semiconductor wafers, semiconductor workpieces, and other workpieces such as memory disks and the like. Embodiments of the invention may be applied to any workpiece on which material is deposited or which are structured. A specimen includes a surface to be structured or on which layers are deposited, an edge, and typically a bevel.

Typically, the embodiments described herein refer to valves for charged particle beam devices and charged particle beam devices with vacuum chambers or vacuum recipients, wherein valves according to embodiments described herein are provided. Thereby, the valve units for charged particle beam devices can be considered specific to charged particle beam devices in light of their electromagnetic properties, there height limitations, their ability to block a charged particle beam without excessive ESD, etc. For example, the so-called electron stimulated desorption (ESD) from the surfaces in the vacuum chambers can be considered disadvantageous. This is especially true for the gun chamber, wherein the emitter gun is located. For example, a cold field emitter requires a pressure of about $5 \times 10^{-1}$ mbar for stable operation.

According to some embodiments, which can be combined with other embodiments described herein, the valve units described herein can be configured for vacuum chambers in general, wherein a passageway is provided in a vacuum chamber. Typically, the passageway is defining a straight path such that substrates or other objects can be inserted in the vacuum chamber and the vacuum chamber can be sealed after the substrate or object has travelled through the passageway.

Accordingly, the valve units are also adapted for UHV applications having a pressure of e.g. $1 \times 10^{-9}$ mbar and below and can generally be used for application with high vacuum (e.g. $1 \times 10^{-3}$ mbar and below) and ultra high vacuum (e.g. $1 \times 10^{-9}$ mbar and below). Those skilled in the art would also appreciate that all discussions herein, which relate to vacuums, refer to a higher or better vacuum if the pressure is reduced. Thus, the higher the vacuum is, the smaller the pressure is.

FIG. 1A shows the valve unit 100. The valve unit 100 includes a valve housing 102. Within the valve housing 102 a beam path portion 103 (see, for example, reference numeral in FIG. 1B) is provided such that an electron beam or and ion beam can pass through the opening in the valve housing 102 along the optical axis or beam path 2.

The valve housing is vacuum sealed such that the pressure in that area 101 within the valve housing 102 can be controlled. Thereby, as the valve unit 100 is configured for a charged particle beam device, the region outside of the valve housing 102 is typically operated under vacuum conditions, for example, high vacuum or ultrahigh vacuum. The pressure within the valve housing 102, i.e. the pressure in the area 101 can be controlled via conduit 104 and valve 105. Thereby, according to different embodiments, atmospheric pressure, vacuum or compressed air can be provided within the vacuum sealed valve housing 102.

FIG. 1A shows the valve unit in an open position where the beam can pass along the beam path 2 and through the beam path portion 103 or opening in the valve housing 102. According to different implementations thereof, that beam path portion 103 can be an opening with a tube portion such that the valve housing 102 is vacuum sealed with respect to the outside environment, and/or the beam path portion 103 can be a recess or another portion such that the beam of charged particles can pass therethrough.

Figure 1B:
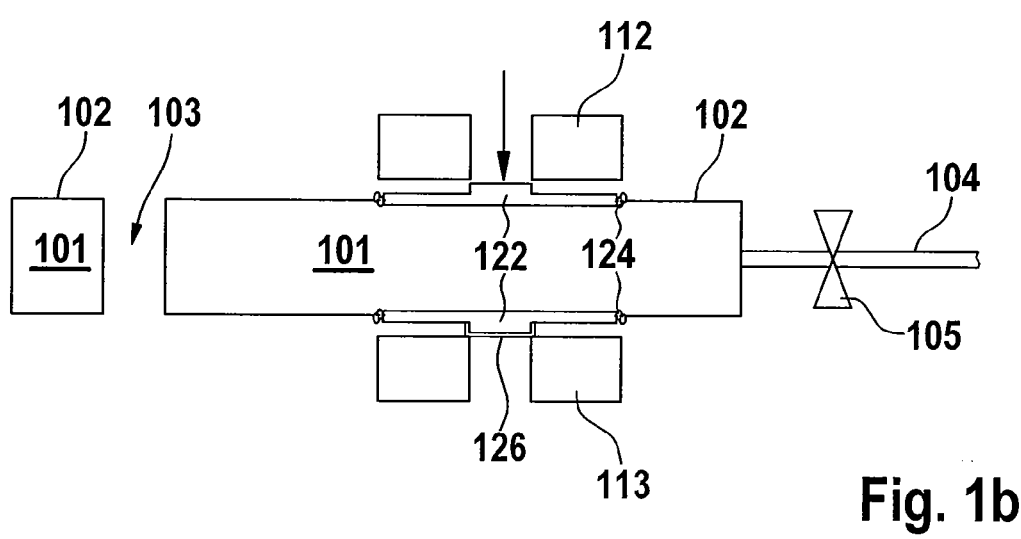
Figure 1C:
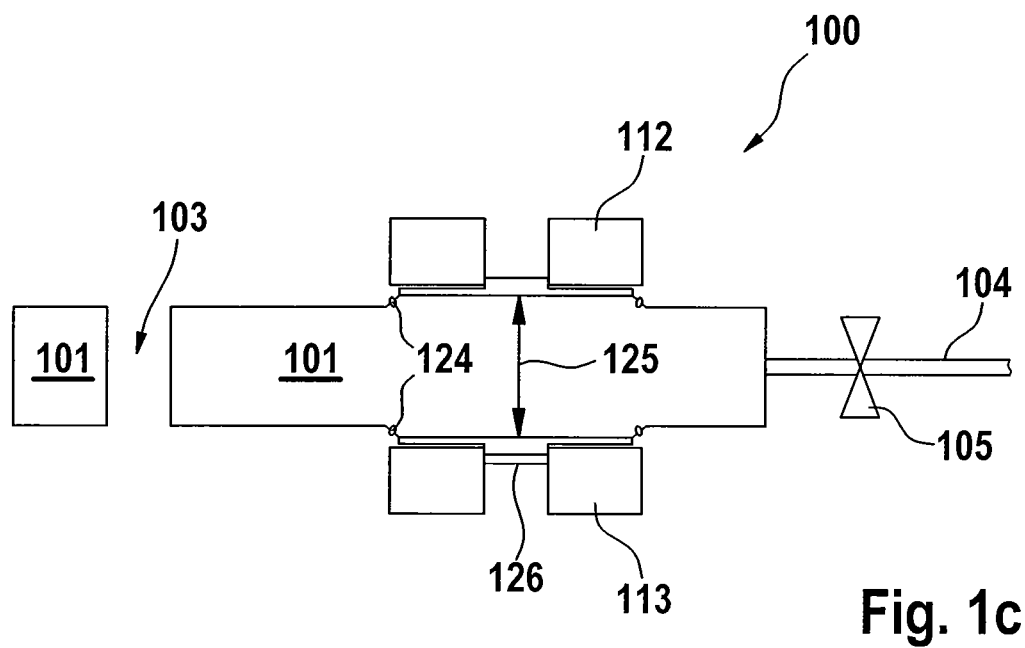
Figure 2:
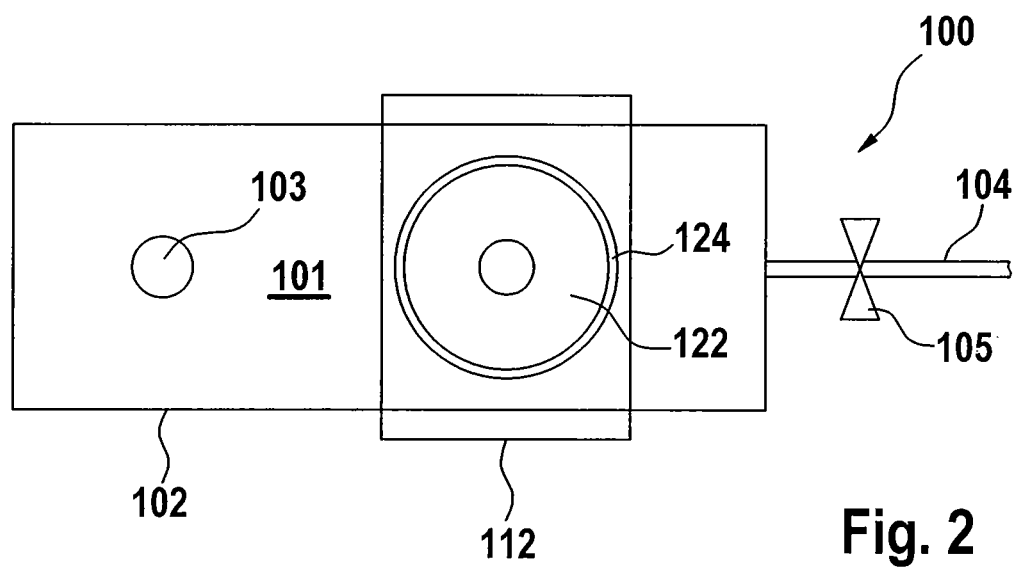
FIG. 2 shows another view of a valve unit for a charged particle beam device according to embodiments described herein.

As shown in FIG. 1B, the valve housing 102 and, thereby, the beam path portion 103 is moved from the first position shown in FIG. 1A to the second position shown in FIG. 1B. Thereby, the sealing elements 122 are moved to essentially the same position in FIG. 1B where the beam path portion 103 has been provided in FIG. 1A. FIGS. 1A to 1C show an upper sealing element 122 and a lower sealing element 122. The sealing elements are connected to the valve housing 102 with a flexible element. For example, the flexible element can be a bellow or a membrane for connecting the sealing element 122 with the valve housing 102. This can be even better understood with reference to FIG. 2. FIG. 2 illustrates a circular sealing element 122, which is connected to the valve housing 102 by a ring-shaped connection, i.e. flexible element 124.

As shown in FIGS. 1A and 1B the sealing element 122 can include a seal 126. In FIG. 1B the sealing elements 122 are positioned to face support surfaces 112 and 113. The support surfaces can be a part of the support for the valve unit 100. The support can, for example, be a bracket provided around the valve housing 102. Typically, the bracket has openings 112a and 113a, which correspond to the opening in the valve housing for having that beam pass therethrough.

As illustrated in FIGS. 1A and 1B, the valve housing 102 can move from the first position, i.e., the open position, in the second position shown in FIG. 1B without having contact to the surfaces 112 and 113. Thereby, the movement of the valve unit from an open position to a position configured for closing the valve can be conducted without particle generation within a vacuum chamber of the charged particle beam device.

In order to provide a vacuum seal with the valve unit 100, in the position shown in FIG. 1B the valve 105 can be opened and the pressure within the valve housing, i.e. the area 101, can be increased by providing compressed air or by reducing the vacuum in the valve housing through conduit 104. Thereby, the sealing elements 122 move as indicated by arrow 125 shown in FIG. 1C. The valve 105 can be closed when the sealing elements 122 move by the movement, which is vertically oriented in FIGS. 1B to 1C, in their sealing position.

Thereby, according to embodiments described herein, a first movement (e.g. horizontally from FIG. 1A to FIG. 1B) and a second movement different from the first movement (e.g. vertically from FIG. 1B to FIG. 1C) can be conducted. This allows for a friction free movement of the housing portion as compared to the support surfaces 112 and 113. Thus, particle generation in the area of the vacuum chambers of a charged particle beam device and outside of the housing of the valve can be reduced or avoided. The movement mechanism for the first movement from FIG. 1A to FIG. 1B will be explained in more detail with respect to FIGS. 3 and 4 and it will be seen that moving parts, which could generate particles, are provided inside the valve housing 102, such that generated particles do not influence the charged particle beam device.

Typically, vacuum valves are used to isolate vacuum recipients from air or neighboring vacuum recipients. According to embodiments described herein a valve which is used mainly in particle beam systems is provided. Thereby, a mechanism brings the seal into the sealing position by an external actuator. By doing so, the valve usually blocks (see, e.g. FIGS. 1B and 1C) a beam line or beam path. In this position the valve can separate two vacuum recipients from each other.

A state of the art valve needs a lot of space, has moving parts in vacuum regions and requires strong forces to compress a seal. All this makes the inclusion of valves cumbersome, and even more adversely, leads to the creation of particles due to the mechanical movements and friction, which is especially detrimental for particle beam systems used in semiconductor manufacturing. In addition, the space requirements inside the particle beam column usually lead to an increase in column length which negatively affects the optical performance. These problems become especially severe if several apertures have to be closed simultaneously, e.g. in a multi-column optical system and/or multi-charged particle beam device. Either the same mechanism has to be installed for each seal (per column), or a joint mechanism can be utilized. In the latter case, mechanical tolerances are given, because the single actuator might apply largely different forces to the individual seals. Space requirements and danger of particle creation become even more important issues in multi column systems.

According to embodiments described herein, the second movement for sealing the pressing the sealing element against the surface for sealing can be conducted by a common movement for a plurality of openings. For example, the pressure provided within the sealed valve housing provides a sealing force, which is irrespective of mechanical tolerances.

According to embodiments described herein, relative movements of components inside the vacuum chambers or vacuum recipients are without contact and friction. Thereby, particle generation is reduced. Further, as the sealing, i.e. bringing the sealing elements in a sealing position, can be conducted independent from the other movement and inside the valve housing, e.g. by compressed air, a plurality of beam paths can be closed simultaneously without much additional effort. Accordingly, the valve units as described herein can be particularly useful for multi-column optical systems and/or multi-charged particle beam devices.

However, in light of the fact that the particle generation in the vacuum recipient is reduced, i.e. particles are generated in the valve housing only, and in light of the fact that particular generation is also to be improved for applications like substrate processing in vacuum chambers, embodiments described herein, can also be provided for vacuum recipients other than for charged particle beam devices. Thereby, a passageway for inserting or removing an object like a substrate into or out of the vacuum chamber can be provided in the vacuum chamber. The valve housing includes a passageway portion such that for closing the first movement brings the passageway portion from a first position, wherein the passageway portion is in alignment with the passageway of the vacuum chamber, to a second position, wherein the sealing element or sealing piston is in alignment with the passageway or a sealing surface thereof. The second movement, which is different from the first movement of the valve unit seals the vacuum chamber. Due to the fact that no particle generation is within the vacuum chamber, the processing of substrates or the like can be improved. Even though the figures described herein refer to charged particle beam applications, it is understood that other vacuum applications with passageways in general, rather than a beam paths only, can utilize the embodiments described herein.

According to embodiments described herein, the operation of a valve unit according to embodiments is conducted in two steps and the valve units includes a valve positioning unit at least one sealing element to conduct the sealing in two steps. Thereby, the valve positioning unit is adapted for selectively providing a first movement of the valve housing such that the beam path portion or passageway portion is selectively moved into and out of the beam path or path defined by the passageway and the at least one sealing element is configured for a second movement, wherein the second movement is different from the first movement.

To close the valve from an open position (FIG. 1A), the valve is moved along a first direction, e.g. sideways, into the path of the beam or the passageway for an object. Thereby, sealing elements can be provided above or below the sealing surfaces. Typically, only a small mechanism for a lateral displacement is needed in order to move the valve in and out of the aperture area. As this movement does not include compression of a seal, e.g. an o-ring or the like, the mechanism can be small. For example, the movement can be conducted by air pressure, i.e. a pneumatic actuator, motors, or the like. Thereby, the valve unit has a position, for example a lateral position in FIG. 1B that corresponds to a closing position, wherein sealing can be conducted.

To actually close or seal the valve (FIG. 1C), the pressure in the area 101, i.e. within the sealed valve housing 102, is increased. For example, air pressure can be applied to the inside of the valve so that the seals are pressed up and down closing the apertures. The air pressure in the container can be increased, until the required force is exerted on the sealing surfaces.

According to different embodiments, which can be combined with other embodiments described herein, a pressure difference between the inside of the valve housing and the outside of the valve housing is provided. This pressure difference can be used for the second movement of the sealing elements. Typically, the outside of the valve housing will be under vacuum, e.g. high vacuum or UHV during operation. The pressure difference can be established by having a higher pressure as compared to the vacuum chamber inside the valve housing or by providing compressed air in the housing.

According to yet further embodiments, the second movement of the sealing elements for the sealing of the valve after the valve housing has been provided in the close-position can also be conducted by motors, by extender rods, or other mechanical actuators. Yet, a pressure difference can be easily applied within the entire valve housing. This makes the valve units particularly useful for multi-beam devices as outlined in more detail below.

The second movement of the sealing elements (e.g. arrow 125 in FIG. 1C) can be described as an expansion of the one or more sealing elements in the closed-position. Thereby, the actual sealing action is conducted. As the outside of the valve housing can typically be provided under high vacuum or UHV conditions, the expanding forces acting on the sealing elements might already apply under vacuum conditions inside the valve housing. In order to adjust for an appropriate pressure regime for the pressure difference, it is possible that, according to some embodiments, which can be combined with other embodiments described herein, the flexible elements include a spring or other means for pre-biasing the sealing elements.

According to different embodiments, which can be combined with other embodiments described herein, the sealing elements can be pistons, e.g. circular pistons, or the like. The flexible elements for connecting the sealing elements to the valve housing can be bellows, membranes, corrugated diaphragms, or the like. Thereby, an expansion of the sealing elements can be provided while the valve housing maintains it's vacuum seal.

Returning back to FIGS. 1A to 1C, the sealing elements as shown in FIG. 1A are in a compressed state, i.e. by a pre-biasing of the flexible elements 124 and/or by a vacuum, e.g. in arrange of $1 \times 10^{-2}$ mbar, (or atmospheric pressure) in the area 101, i.e. the inside of the valve housing. The valve unit is in an open position, wherein the beam path through beam path portion 102 is open. Generally, the path defined by the passageway and the passageway portion is open. In FIG. 1B the housing portion and thereby the beam path portion 103 (or passageway portion) and the sealing elements 122 have been re-positioned by a first movement. In FIG. 1B there is gap between the sealing elements and the surfaces 112 and 113. Accordingly, the first movement does not incur friction or particle generation. In FIG. 1, the sealing elements, e.g. the pistons expand. Thereby, a second movement different from the first movement can be provided. This can for example be realized by an increasing pressure in the area 101, i.e. inside the valve housing. For example, compressed air can be used. Thereby, the upper sealing element 122 is pressed against the surface 112 and the lower sealing element 122 is pressed against the lower surface 113. The pressure on lower surfaces further presses the vacuum seal 126 in order to vacuum seal the outside area above the valve unit 100 from the outside area below the valve unit 100.

According to different embodiments, which can be combined with other embodiments described herein, the surfaces 112 and 113 can be provided as a part of the valve unit, e.g. a bracket provided around the valve housing, or at least one of the surfaces can be a portion of a vacuum chamber or vacuum recipient to be sealed. Typically, this portion of the vacuum chamber will be a portion including an aperture for having the beam or an object pass therethrough. According to typical embodiments, at least one of the surfaces against which the sealing elements are pressed can alternatively correspond to a column upper part or a column lower part. Typically, the pressing can be directed towards a column upper part and a column lower part.

As shown in FIGS. 1A to 1C one vacuum seal 126 is provided, for example at the lower surface 113. However, to optional modifications thereof, the seal can also be provided at the other surface (e.g., the upper surface in FIGS. 1A to 1C) or at both surfaces. The valve unit according to embodiments described herein, further provides two times the force of one sealing element if the first sealing element, e.g. a piston, and a second sealing element, e.g. a piston, is utilized as shown in FIGS. 1A to 1C.

According to yet further embodiments, in the case where pressure is used for sealing movement of the sealing elements, the size, i.e. the area of the sealing elements can be configured for adjusting the sealing force. For example, the diameter of the circular piston shown in FIG. 2 can be increased. Thereby, if during operation a similar pressure is used in the valve housing 102, the force acting on the sealing elements is also increased. According to typical embodiments, which can be combined with other embodiments described herein, the pistons can have a radius of about 10 to 60 mm. Similar areas can be applied for non-circular pistons.

According to some embodiments, which can be combined with other embodiments described herein, charged particle beam devices can include a plurality of columns or a plurality of beams within one column, e.g. for increasing throughput of measurement testing, inspection, or structuring. Thereby, a valve unit can be required for each of the apertures provided for each of the respective electron or ion beams, or valve units for two or more beams can be required.

If the system requires multiple beam paths to be sealed by one or more valves, the embodiments can be extended to a plurality of seal elements and beam path portions, respectively. The seal elements can be arranged on a common valve rod, and all seal elements and openings will be moved by a first movement at the same time, e.g., by application of air pressure to a pneumatic actuator to all of them simultaneously. Thereafter, the vacuum chambers or vacuum recipients can be sealed by having all seal elements being sealed by a second movement at the same time, e.g., by application of air pressure to all of them simultaneously, such that all seal elements have an expansion movement. Thereby, for example, potential problems with mechanical tolerances between seals are solved automatically since the seals are pushed out until the required force is exerted, independently of mechanical tolerances.

Figure 3:
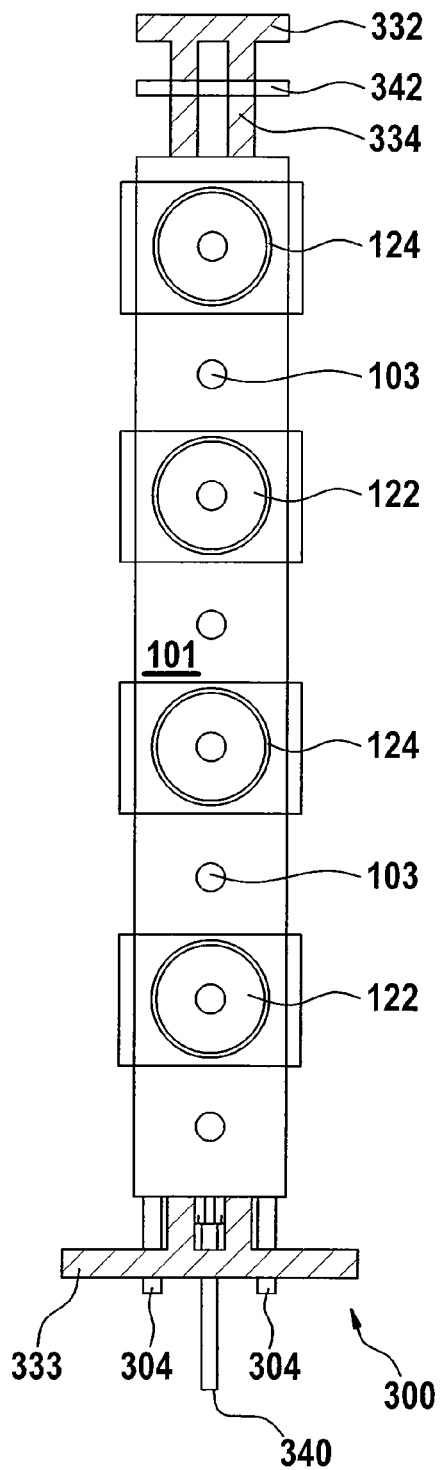
FIG. 3 shows yet another valve unit for a charged particle beam device having two or more charged particle beam paths according to embodiments described herein.
Figure 4:
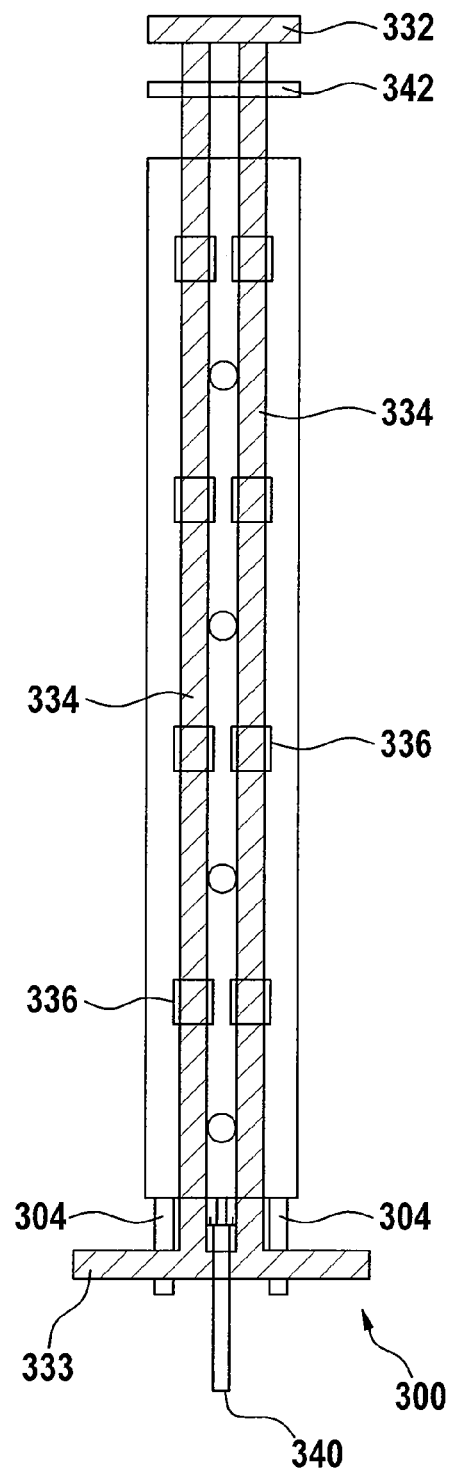
FIG. 4 shows an even further embodiment of a valve unit for a multi-charged particle beam device according to embodiments described herein.

FIGS. 3 and 4 illustrate embodiments of valve units 300 for a plurality of charged particle beams. Thereby, FIG. 4 shows the inside of the valve unit. A valve unit for a single beam can include the same elements as described with respect to FIGS. 3 and 4. The valve unit 300 includes a valve housing 102. Within the valve housing 102 beam path portions 103 are provided such that and electron beam or and ion beam can pass through the openings in the valve housing 102 along the optical axes or beam paths. The valve housing is vacuum sealed such that the pressure in the area 101 within the valve housing 102 can be controlled. Thereby, as the valve unit 300 is configured for a multi-charged particle beam device, the region outside of the valve housing 102 is typically operated under vacuum conditions, for example, high vacuum or ultra-high vacuum. The pressure within the valve housing 102, i.e. the pressure in the area 101 can be controlled via conduits or connections 304. Thereby, according to different embodiments, atmospheric pressure, vacuum or compressed air can be provided within the vacuum sealed valve housing 102.

Sealing elements 122 are, for example, upper sealing elements 122 and a lower sealing elements 122, are provided for each of the beams or respective beam paths. The sealing elements are connected to the valve housing 102 with flexible elements 124. For example, a flexible element can be a bellow, a corrugated diaphragm, or a membrane for connecting the sealing elements 122 with the valve housing 102.

In order to provide a vacuum seal with the valve unit 300, in the closed-position of the housing, the pressure within the valve housing, i.e. the area 101, can be increased by providing compressed air or by reducing the vacuum in the valve housing through conduit or connector 304. Thereby, the sealing elements 122 expand towards a sealing surface.

According to embodiments described herein, a first movement and a second movement different from the first movement can be conducted. This allows for a friction free movement of the housing portion as compared to the sealing surfaces. Thus, particle generation in the area of the vacuum chambers of a charged particle beam device and outside of the housing of the valve can be reduced or avoided.

The first movement from an open position to a position where the sealing elements can seal, can be conducted by a valve positioning unit adapted for selectively providing the first movement of the valve housing, such that the beam path portions can be selectively moved into and out of the beam paths. According to typical embodiments, which can be combined with other embodiments described herein, the valve position unit can include base portions 332 and 333. Typically, one of the base portions can be adapted to be connected to a vacuum recipient or vacuum chamber of a charged particle beam device. In FIGS. 3 and 4 this is indicated by having the base portion 333 being enlarged as compared to the base portion 332. Thereby, a flange for a vacuum connection to the vacuum chamber can be provided.

The base units are connected to guiding elements 334 such as guiding rods or the like. The housing can be guided on the guiding elements through guiding bearings 336, which are connected to the guiding elements 334 and the housing respectively. An actuator 340 such as a pneumatic cylinder, a motor, or another actuator can be provided in order to move the valve housing 102 relative to the base portions 332 and 333 (upwards in FIGS. 3 and 4). The valve positing unit can further include an abutment or stop face 342, such that the close position of the valve housing 102 can be well-defined. Accordingly, all beam path portions 103 can be moved into an open position for having the beam paths passing through the openings in the valve housing. The housing can further be moved into a second position where the sealing elements 122 are provided facing sealing surfaces of the charged particle beam device and/or the valve unit itself. In the closed-position, a sealing action can be conducted by a second movement different from the first movement.

As can be seen by FIGS. 3 and 4, the moving portions like the guiding rod and the guiding bearing are provided inside the valve housing. Accordingly, particle generation by moving parts does not deteriorate the environment on the vacuum chambers of the charged particle beam device. Small portions of the guiding rods 334, which might be partly outside of the valve housing, can be encapsulated or covered by bellows or the like.

According to some embodiments, which can be combined with other embodiments described herein, the first movement of the housing can be a translation in a plane and the second movement of the sealing elements can be essentially perpendicular to the plane. Thereby, according to yet further embodiments, which can be combined with other embodiments described herein, the movement of the sealing elements can be essentially perpendicular to the sealing surface such that no shear forces act upon the sealing elements, e.g. an o-ring or the like. However, this can also be provided by having the first movement being, for example, a rotation and the second movement being perpendicular to the sealing surface. Further, it will be understood, that according to yet further embodiments, the surfaces provided, to which the sealing elements or seals are attached, can include protrusions or recesses in order to provide improved sealing conditions. Further, these surfaces will typically be manufactured with better evenness and/or smoothness as compared to other arbitrary surfaces.

Typically, vacuum valves are used to isolate vacuum recipients from air or neighboring vacuum recipients. According to embodiments described herein a valve which is used mainly in particle beam systems is provided. Thereby, a mechanism brings the seal into the sealing position by an external actuator. By doing so, the valve usually blocks a beam line or beam path. In this position the valve can separate two vacuum recipients from each other.

Figure 5:
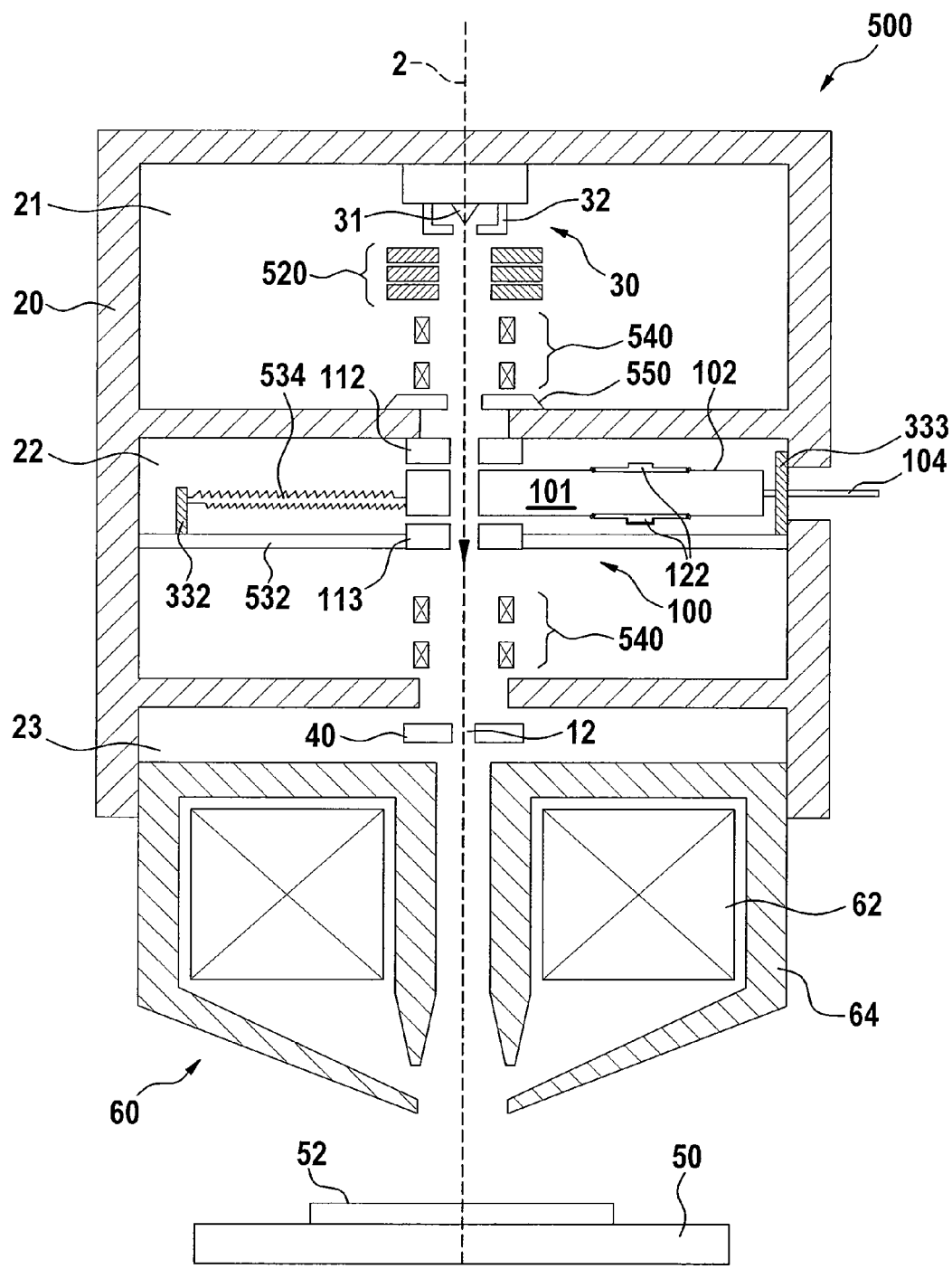
FIG. 5 shows a schematic view of the charge particle beam device and including a valve unit according to embodiments described herein.

Further embodiments can be described with respect to FIG. 5. FIG. 5 shows a charged particle beam device 500. The charged particle beam column 20 provides a first chamber 21, a second chamber 22 and a third chamber 23. The first chamber, which can also be referred to as a gun chamber, includes the charged particle source 30 having an emitter 31 and suppressor 32. A charged particle beam is generated by the charged particle beam source 30, is aligned to the beam limiting aperture 250, which is dimensioned to shape the beam, i.e. blocks a portion of the beam, passes through opening 12 of the detector 40 and is focused on the specimen 52 positioned on a specimen position on the specimen stage 50. On impingement of the charged particle beam, for example, secondary or backscattered electrons are released from the specimen 50, which can be detected by the detector 40.

According to some embodiments, which can be combined with other embodiments described herein, a condenser lens 520 and a beam shaping or beam limiting aperture 550 is provided. The two-stage deflection system 540 is provided between the condenser lens and the beam shaping aperture 250.

As shown in FIG. 5, according to some embodiments, a detector 40 can be provided above the objective lens such that the primary charged particle beam passes through the opening 12 in the detector. The objective lens 60 having pole pieces 64 and a coil 62 focuses the charged particle beam on a specimen 52, which can be positioned on a specimen stage 50.

As shown in FIG. 5, a valve unit 100 can be provided for separating two adjacent chambers, e.g. the first chamber 21 and the second chamber 22. In an open position of the valve unit, the charged particle beam can move through the beam path portion of the valve housing 102. For example, the beam path portion can be a tube in the housing, which is provided such that the housing is a vacuum sealed housing.

In FIG. 5, the valve unit is provided with an upper surface 112 and a lower surface 113 against which the sealing elements are pressed in a sealing state of the valve unit. According to yet further embodiments, which can be combined with other embodiments described herein, the upper sealing surface shown in FIG. 5 can be omitted and the portion of the vacuum chamber can be utilized as the sealing surface. Accordingly, in a different arrangement as compared to FIG. 5 it is also possible that the lower surface 113 is omitted and a portion of a vacuum chamber, typically a portion around an aperture in a vacuum chamber is used as a sealing surface.

As shown in FIG. 5, according to some embodiments, which can be combined with other embodiments described herein, the valve unit 100 is mounted with a support 532 in the charged particle beam device 500. Typically, the valve unit can include base portions 332 and 333. Thereby, for example, the base portion 333 can be provided as a vacuum flange to be press sealed against a portion of the column 20 to vacuum seal the column. The base portion supports the valve housing 102, using rods or the like, wherein a connection is provided within the valve housing, i.e. outside of the vacuum environment of the chamber 22. Further, FIG. 5 illustrates bellows 534 provided for the guiding rods to prevent generated particles to enter the chamber 22.

According to some embodiments, which can be combined with other embodiments described herein, at least one of the surfaces 112 and 113 are provided by a bracket for the valve housing. Thereby, however, the valve housing can be moved without direct contact or friction to the bracket such that no particles are generated.

According to further embodiments, which can be combined with other embodiments described herein, the height, that is dimension of the valve unit in a direction of the beam path, can be about 15 mm or below, for example 10 mm or below, such as 5 mm to 10 mm. Due to the easier mechanism of sealing the sealing elements with the adjacent surfaces, the height can be reduced. Accordingly, the space requirements in the column can be reduced and the column length can, thus, be reduced. As a reduced column length is beneficial for the optical properties of the column, the charged particle beam device, including valve units according to embodiments described herein, can be improved as well.

Figure 6:
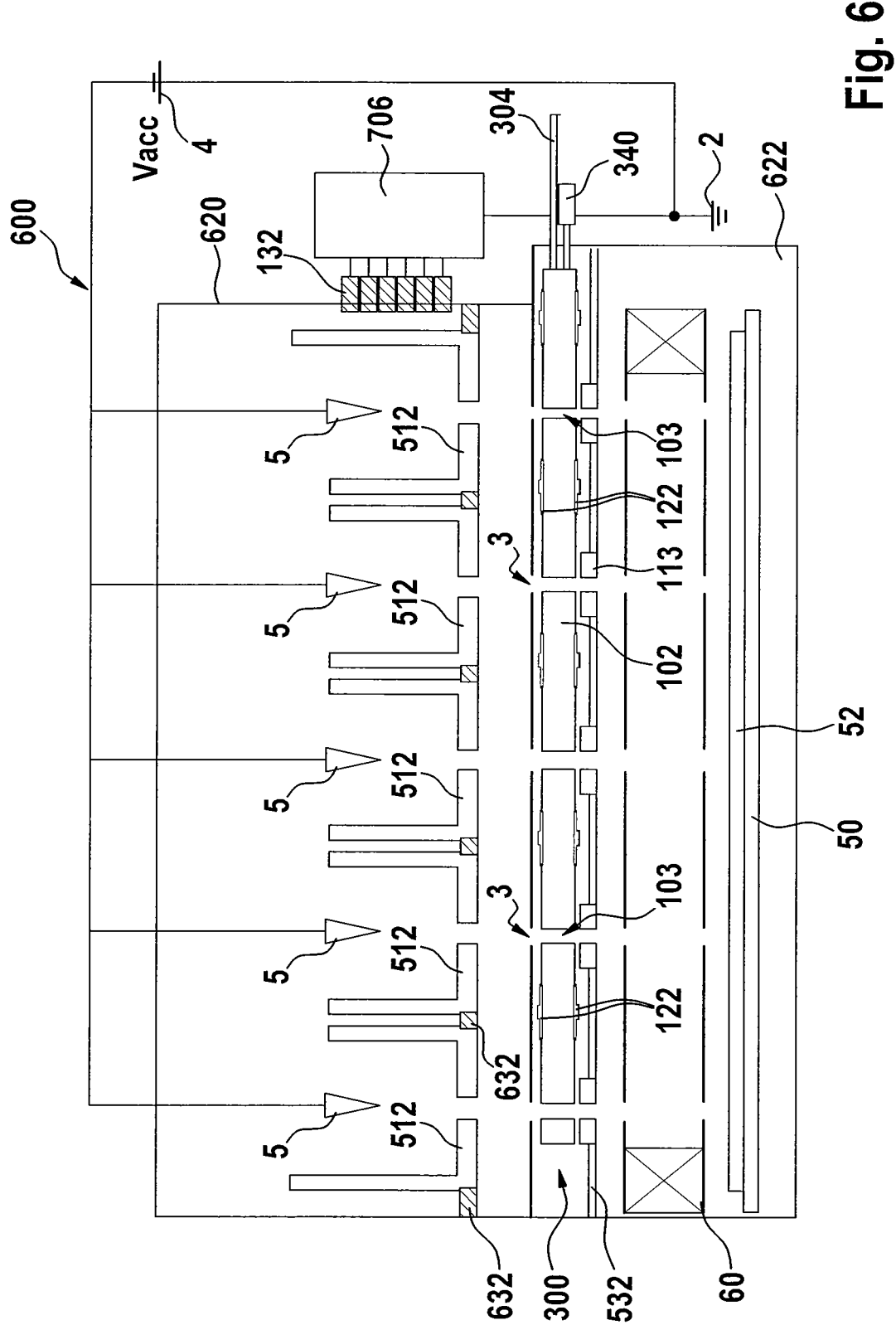
FIG. 6 shows a view of a multi-charged particle beam device and including valve units according to embodiments described herein.

According to yet other embodiments, the valve units described herein can be advantageously used for a charged particle multi-beam device, wherein a plurality of emitter tips is arrayed. FIG. 6 shows a column for a plurality of beams of a multi-beam system. The system 600 includes a housing portion 620 and a further housing portion 622, each providing a vacuum chamber or vacuum recipient of the charged particle beam device. Emitter tips 5 are provided each for emitting a charged particle beam device. The emitter tips 5 are applied with an acceleration voltage Vacc of voltage supply 4. The extractors 512, which are isolated from each other by isolators 632 are each provided with an extraction voltage provided by power supply 706. Both, power supply 4 and 706 are connected to ground 2. The charged particle beams from each of the emitters 5 are guided towards the specimen 50, which can be provided on specimen support 50. Typically, the beams are focused on the specimen 52 by objective lens 60.

The vacuum chambers 621 and 622 can be separated from each other such that individual vacuum conditions can be applied or that the chambers can be evacuated individually. Therefore, according to embodiments described herein, a valve unit 300 is provided. The valve unit 300 includes a vacuum sealed valve housing 102. Within the valve housing 102 beam path portions 103 are provided such that and electron beam or and ion beam can pass through the openings in the valve housing 102 along the optical axes or beam paths. The valve housing is vacuum sealed such that the pressure within the valve housing 102 can be controlled. Thereby, as the valve unit 300 is configured for a multi-charged particle beam device, the region outside of the valve housing 102 is typically operated under vacuum conditions, for example, high vacuum or ultrahigh vacuum. The pressure within the valve housing 102, i.e. the pressure in the area 101 can be controlled via conduit or connection 304. Thereby, according to different embodiments, atmospheric pressure, vacuum or compressed air can be provided within the vacuum sealed valve housing 102.

Sealing elements 122, i.e., upper sealing elements 122 and lower sealing elements 122, are provided for each of the beams or respective beam paths. The sealing elements are connected to the valve housing 102 with flexible elements as described above. For example, a flexible element can be a bellow, a corrugated diaphragm, or a membrane for connecting the sealing elements 122 with the valve housing 102.

In order to provide a vacuum seal with the valve unit 300, in the closed-position of the housing the pressure within the valve housing can be increased by providing compressed air or by reducing the vacuum in the valve housing through conduit or connector 304. Thereby, the sealing elements 122 expand towards a sealing surface. Before pressing the sealing elements against surfaces 113 and against the upper surface of the chamber 622, the actuator moves the valve housing such that the sealing elements 122 face the apertures 3 in the housing.

The embodiments described herein, which refer to charged particle beam devices as illustrated in FIGS. 5 and 6, may also include additional components (not shown) such as condenser lenses, deflectors of the electrostatic, magnetic or compound electrostatic-magnetic type, such as Wien filters, scanning deflectors of the electrostatic, magnetic or compound electrostatic-magnetic type, stigmators of the electrostatic, magnetic or compound electrostatic-magnetic type, further lenses of the electrostatic, magnetic or compound electrostatic-magnetic type, and/or other optical components for influencing and/or correcting the beam of primary and/or secondary charged particles, such as deflectors or apertures. Indeed, for illustration purposes, some of those components are shown in the figures described herein. It is to be understood that one or more of such components can also be applied in embodiments of the invention.

According to embodiments described herein, valve units, charged particle beams having valve units and methods of operating valve units in a charged particle beam device are described. Thereby, a vacuum sealed housing can be moved in a first direction and sealing elements can be moved in a second direction, different from the first direction, to seal vacuum chambers or recipients off from each other. Thereby, according to different embodiments, one or more of the following aspects, features and details can be realized: Reduced space requirements inside the column can be provided. The valve can be built flat, e.g. with a height of 10 mm or below, and therefore minimizes column length and loss of optical performance. Reduced space requirement outside the column can be provided. For example, the actuator can be very compact, particularly in light of the fact that the first movement does not participate in the sealing movement. This saves valuable space for other peripheral components. The o-ring compression forces or seal-compression forces act parallel to the optical axis. Thereby, lateral displacement of optical components by their valve can be avoided. This improves alignment aspects and, thus, optical performance. Column contamination by particles generated by moving parts is avoided. All particle generating motion components (guide rails, slides etc) are encapsulated inside the valve and cannot reach the vacuum system of the column. The o-ring or seal will be the only remaining possible source of particle generation. Particle generation with respect to the o-ring or seal can be minimized by different countermeasures: according to different embodiments, which can be combined with other embodiments described herein, the o-ring or seal can be vulcanized to the valve and exposes only a minimum surface, the o-ring or seal acts perpendicular to the sealing surface and is only compressed, no sideways forces act on the o-ring or sealing, no shearing or fulling of the o-ring or seal is provided; and/or the o-ring plate adjusts parallel to the sealing surface automatically. Yet, the system may further provide the benefit that due to simplified mechanism a long life time can be achieved.

Within the embodiments described above, the first movement and the second movement are caused by different sources for the movement. For example, the first movement for moving the housing can be conducted by a pneumatic actuator, an electrical actuator, a motor, or the like and the second movement for moving the sealing element can be conducted by a motor, by air pressure or by other appropriate means. According to yet further embodiments, which can be combined with other embodiments described herein, the source for the two movements can be the same. For example, a movable membrane, a movable pin, or the like can be provided at a side of the valve housing, wherein the side is facing a direction of the first movement. The movable membrane or pin can be provided such that a small increase in pressure within the valve housing results in expansion of the membrane or movement of the pin. Thereby, the valve housing can be forced away or forced off from an external block or an external face to be moved towards a stop face. Typically, this movement can be spring biased or the like. However, if this first movement is initiated by a smaller pressure increase in the valve housing as compared to the second movement initiated by a pressure increase in the valve housing, the first movement is conducted first and the second movement of the sealing element is conducted upon a further increase of the pressure within the valve housing.

Thus, according to some embodiments, which can be combined with other embodiments described herein, the valve positioning unit can be adapted to act upon a pressure increase to a first pressure within the valve housing and the sealing element can be adapted to act upon a further pressure increase to a second pressure within the valve housing, wherein the second pressure is larger than the first pressure. This might also be understood such that the pneumatic actuator 349 shown in FIGS. 3 and 4 acts upon a smaller pressure as compared to the sealing elements 122 and that the pressure for the pneumatic actuator 340 is provided from inside of the valve housing. Thus, both movements are trigger by pressure differences, i.e. a first pressure difference and a second pressure difference, which is provided within the valve housing as compared to outside of the valve housing.

According to yet further embodiments, which can be combined with other embodiments described herein, the valve housing 102 can include a materials selected from the group consisting of a non-magnetic material, stainless steel or the like. Particularly, the beam path portion 103, e.g. the tubular part of the housing for having the beam pass therethrough can have a shielding material.

Figure 7:
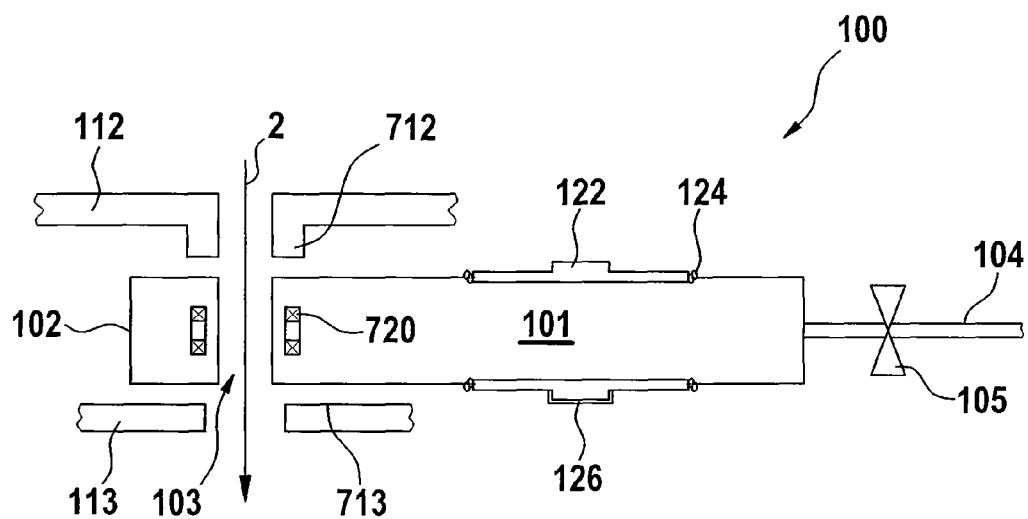
FIG. 7 illustrates yet further embodiments of valve units according to embodiments described herein.

According to yet further embodiments, which can be combined with other embodiments described herein, a valve unit can also include optional modifications as described with respect to FIG. 7. FIG. 7 shows the valve unit 100. The valve unit 100 includes a valve housing 102. Within the valve housing 102 a beam path portion 103 is provided such that an electron beam or an ion beam can pass through the opening in the valve housing 102 along the optical axis or beam path 2.

The valve housing is vacuum sealed such that the pressure in that area 101 within the valve housing 102 can be controlled. Thereby, as the valve unit 100 is configured for a charged particle beam device, the region outside of the valve housing 102 is typically operated under vacuum conditions, for example, high vacuum or ultrahigh vacuum. The pressure within the valve housing 102, i.e. the pressure in the area 101 can be controlled via conduit 104 and valve 105. Thereby, according to different embodiments, atmospheric pressure, vacuum or compressed air can be provided within the vacuum sealed valve housing 102.

FIG. 7 shows an upper sealing element 122 and a lower sealing element 122. The sealing elements are connected to the valve housing 102 with flexible elements 124. For example, the flexible element can be a bellow or a membrane for connecting the sealing element 122 with the valve housing 102. The sealing element 122 can include a seal 126. The sealing elements 122 can be positioned to face elements 112 and 113. Thereby, the lower support member 113 (or a portion of an adjacent chamber) provides the sealing surface 713 against which the o-ring or seal 126 is pressed. Upper member 112 (or a portion of an adjacent chamber) provides a support point 712 against which the upper sealing element is pressed on actuation thereof. The support surfaces can be a part of the support for the valve unit 100. The support can, for example, be a bracket provided around the valve housing 102. Typically, the bracket has openings which correspond to the opening in the valve housing for having that beam pass therethrough. However, the sealing surface and/or the support point can also be a part of the charged particle beam device.

According to yet further embodiments, which can be combined with other embodiments described herein, the valve unit can, for example, include a deflector 720 as indicated by the coils in FIG. 7. If the tubular part forming the beam path portion of the housing is provided by a non-magnetic material, magnetic deflectors can be included in the housing portion. Thereby, for example, a UHV feed-through can be avoided as the valve housing is not evacuated for UHV. According to yet further additional or alternative embodiments, also electrostatic or combined magnetic/electrostatic deflectors can be included in the valve housing. Thereby, typically, the material of the beam path portion and/or the entire valve housing might need to be adapted. Similarly, also magnetic, electrostatic or combined magnetic/electrostatic correctors or other elements can be included. According to yet further additional or alternative modifications, the beam path portion can include apertures like beam shaping apertures or other beam guiding means.

Figure 8:
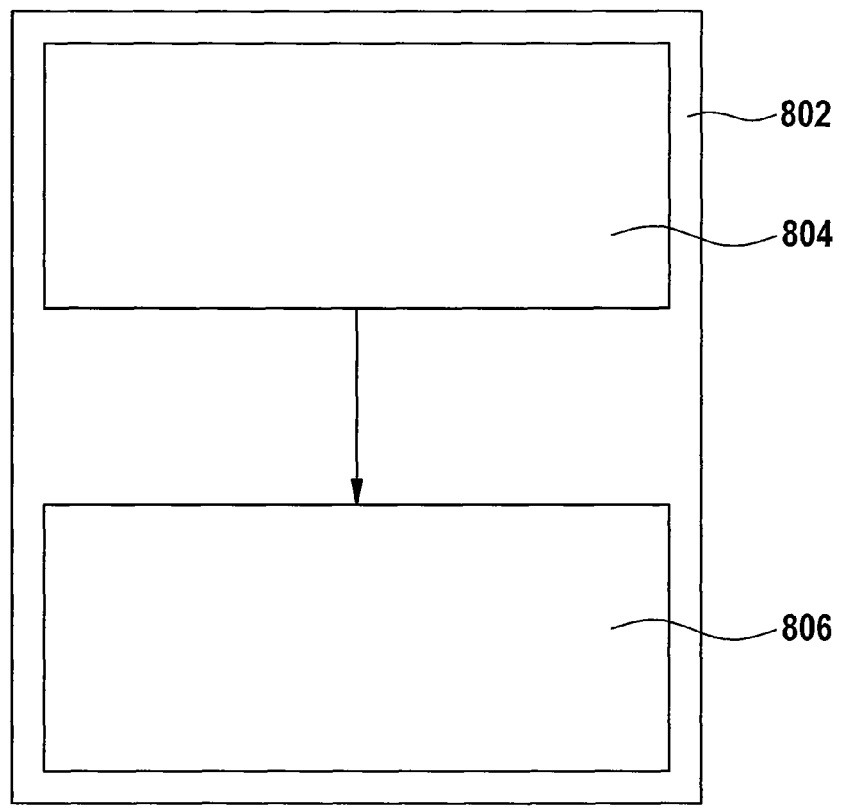
FIG. 8 shows a flow chart illustrating embodiments of operating a valve unit in a charged particle beam device according to embodiments described herein.

FIG. 8 illustrates embodiments of operating a valve unit, for example in a charged particle beam device. As shown in FIG. 8, step 802 illustrates operating the valve from an open state to a closed state. Thereby, step 802 includes two steps. First, a vacuum sealed housing is moved along a first direction from a first position wherein housing provides a path, such as a beam path for the charged particle beam, into a second position wherein a sealing element opposes a sealing surface. Then, a sealing element is moved in a second direction different from the first direction to press the sealing element against the sealing surface. Typically, the second direction is essentially perpendicular to the sealing surface. Further, as the first movement does not include a sealing action as such, the actuator for the first movement can be simple. According to some embodiments, the moving of the sealing element for sealing is conducted by increasing the pressure in the valve housing.

It will be understood that operating the valve from a closed state to an open state can be conducted in a reverse manner. First, a sealing element is moved in a direction different from the first direction to release the sealing element from pressing against the sealing surface. For example, thereby, the gap referred to herein between the sealing elements and the sealing surfaces is provided. Then, the vacuum sealed housing is moved along a direction from a second position wherein a sealing element opposes a sealing surface to a position wherein housing provides a path, such as a straight path for an object like a substrate or a beam path for the charged particle beam.

While the foregoing is directed to embodiments of the invention, other and further embodiments of the invention may be devised without departing from the basic scope thereof, and the scope thereof is determined by the claims that follow.

The invention claimed is:

1. A valve unit configured for a charged particle beam device having a beam path, comprising:
   a vacuum sealed valve housing configured for a pressure difference between the inside of the valve housing and the outside of the valve housing, wherein the housing provides a beam path portion for having a charged particle beam pass therethrough along the beam path;
   a valve positioning unit adapted for selectively providing a first movement of the valve housing such that the beam path portion is selectively moved into and out of the beam path; and
   at least one sealing element configured for a second movement, wherein the second movement is different from the first movement.

2. The valve unit according to claim 1, wherein the second movement is conducted in dependence of the pressure difference.

3. The valve unit according to claim 1, wherein the first movement is a translation in one plane and the second movement is essentially a movement essentially perpendicular to the plane.

4. The valve unit according to claim 1, wherein the at least one sealing element is at least one piston connected to the valve housing with at least one flexible piston support.

5. The valve unit according to claim 1, further comprising:
   at least a second sealing element provided at a side of the valve housing opposing the second sealing element, wherein the second sealing element is configured for a third movement, wherein the second movement and the third movement are in essentially opposite directions.

6. The valve unit according to claim 1, wherein the valve positioning unit comprises at least one of the following elements:
   an actuator element;
   a guiding element; and
   a guide bearing element.

7. The valve unit according to claim 6, wherein the actuator element is a pneumatic actuator element.

8. The valve unit according to claim 6, wherein the guiding element is a guiding rod element.

9. The valve unit according to claim 1, further comprising:
   a valve being connected to the valve housing and being configured for providing vacuum or air pressure within the valve housing.

10. The valve unit according to claim 1, further comprising:
    a valve being connected to the valve housing and being configured for providing vacuum and air pressure within the valve housing.

11. The valve unit according to claim 1, wherein the at least one sealing element is configured for sealing against a sealing surface by the second movement.

12. The valve unit according to claim 1 and being configured for a multi-charged particle beam device having two or more beam paths, wherein the housing provides two or more beam path portions for having two or more respective charged particle beams pass therethrough along the respective two or more beam paths; the valve unit further comprising:
    two or more further sealing elements configured for a second movement, wherein the second movement is different from the first movement.

13. A charged particle beam device having a beam path, comprising:
    one or more vacuum chambers; and
    a valve unit wherein the valve unit comprises:
       a vacuum sealed valve housing configured for a pressure difference between the inside of the valve housing and the outside of the valve housing, wherein the housing provides a beam path portion for having a charged particle beam pass therethrough along the beam path;
       a valve positioning unit adapted for selectively providing a first movement of the valve housing such that the beam path portion is selectively moved into and out of the beam path; and
       at least one sealing element configured for a second movement, wherein the second movement is different from the first movement.

14. The charged particle beam device according to claim 13, wherein the at least one sealing element is configured for sealing against a sealing surface by the second movement, and wherein the sealing surface is a portion of the one or more vacuum chambers.

15. The charged particle beam device according to claim 13 and having two or more beam paths, wherein the valve unit further comprises:
    two or more further sealing elements configured for a second movement, wherein the second movement is different from the first movement.

16. A method of operating a valve unit in a charged particle beam device, comprising:
    closing the valve unit by
    moving a vacuum sealed housing along a first direction from a first position wherein housing provides a beam path for the charged particle beam into a second position wherein a sealing element opposes a sealing surface; and moving the sealing element in a second direction different from the first direction to press the sealing element against the sealing surface.

17. The method according to claim 16, wherein the sealing element is moved by increasing the pressure in the valve housing.

18. The method according to claim 16, wherein the moving along the first direction is conducted by a translation of an actuator element.

19. The method according to claim 16, wherein the moving along the first direction is conducted by a translation of a pneumatic actuator element.

20. The method according to claim 16, wherein the first direction is in a plane and the second direction is essentially perpendicular the plane.

* * * * *